A. T. NEWMAN.
WAVE MOTOR.
APPLICATION FILED AUG. 24, 1908.
919,928.
Patented Apr. 27, 1909.
2 SHEETS—SHEET 1.
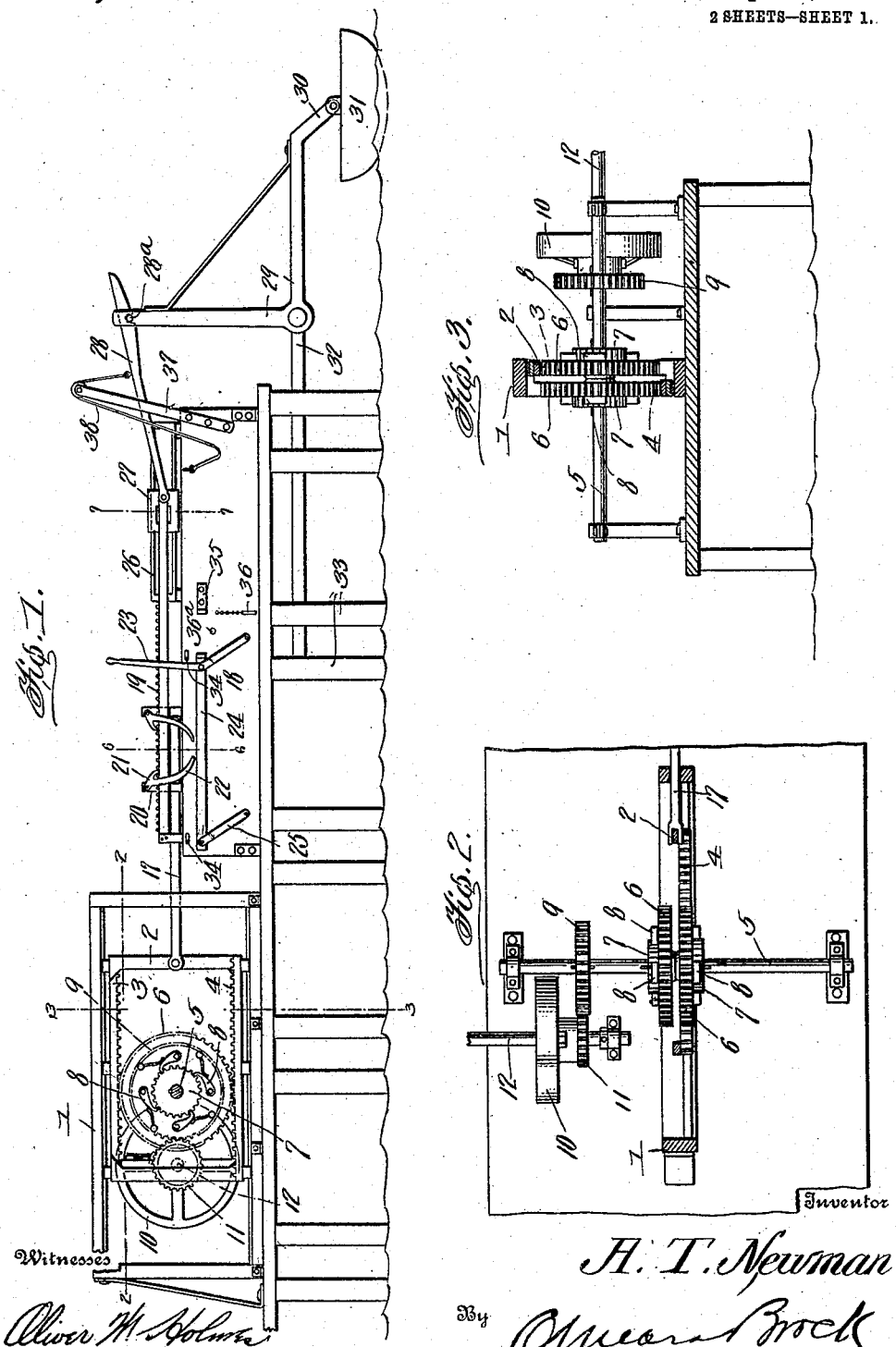

A. T. NEWMAN.
WAVE MOTOR.
APPLICATION FILED AUG. 24, 1908.

919,928.

Patented Apr. 27, 1909.
2 SHEETS—SHEET 2.

Witnesses
Oliver W. Holmes
Geo. P. Wright

Inventor
H. T. Newman
By
Attorneys

UNITED STATES PATENT OFFICE.

ALBERT T. NEWMAN, OF GREELEY, KANSAS, ASSIGNOR OF ONE-HALF TO C. A. ROHRER, OF GREELEY, KANSAS.

WAVE-MOTOR.

No. 919,928.     Specification of Letters Patent.     Patented April 27, 1909.

Application filed August 24, 1908. Serial No. 450,023.

*To all whom it may concern:*

Be it known that I, ALBERT T. NEWMAN, a citizen of the United States, residing at Greeley, in the county of Anderson and State of Kansas, have invented a new and useful Improvement in Wave-Motors, of which the following is a specification.

This invention relates to a wave motor by means of which the vertical rise and fall of a series of waves is transmitted successively into a reciprocatory and a rotary motion with proper provision for the irregular action of the waves, both in wave length and extent of vertical movement.

The invention consists in the novel features of construction hereinafter described, pointed out in the claims and shown in the accompanying drawings, in which—

Figure 4:
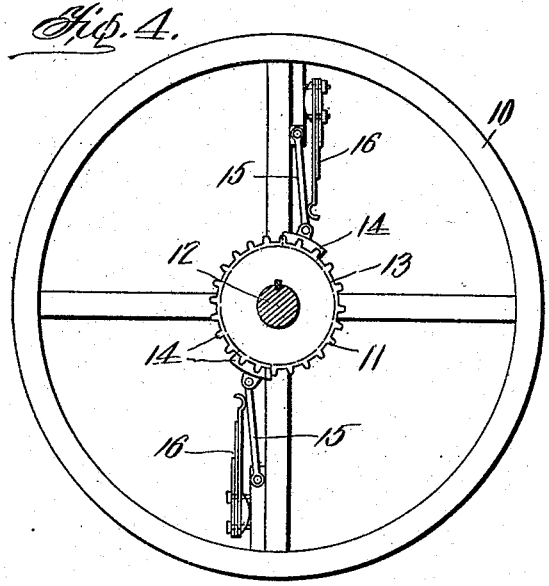
Figure 5:
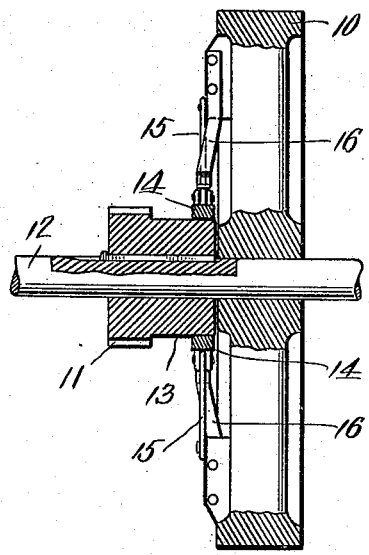
Figure 6:
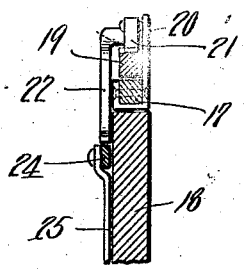
Figure 7:
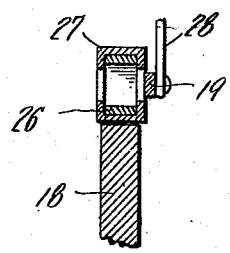

Figure 1 is a side elevation. Fig. 2 is a section on the line 2—2 of Fig. 1. Fig. 3 is a section on the line 3—3 of Fig. 1. Fig. 4 is an enlarged detail view illustrating a clutch and fly wheel, a power shaft being in section. Fig. 5 is a sectional view through the fly wheel and clutch. Fig. 6 is a section on the line 6—6 of Fig. 1. Fig. 7 is a section on the line 7—7 of Fig. 1.

In these drawings 1 represents a rectangular frame forming a guide in which works a plunger 2, also in the form of a rectangular frame. This plunger frame is provided with upper and lower rack bars 3 and 4, offset with respect to each other. A shaft 5 passes centrally through the frame 1 and also through the open frame of the plunger 2. Gear wheels 6 are mounted loosely on the shaft 5 and mesh respectively with the racks 3 and 4, said gears being driven by reciprocatory motion of the plunger. Ratchet wheels 7 are fixed on the shaft 5 and are engaged by spring presssed pawls 8 which lock the ratchets and gears during rotation in one direction, and it is of course understood that the ratchets and pawls are so arranged that while direction of rotation of the gear wheels 6 will change with direction of travel of the plunger, the shaft 5 will be driven in one direction only, during both forward and rearward strokes.

A gear wheel 9 is fixed to the shaft 5 and meshes with a gear wheel 11 fixed on a shaft 12 and on which is mounted a fly wheel 10.

Owing to the irregularity of wave movements, the shafts 5 and 12 will have a variable speed and are subject to sudden strains. To allow for these, the wheel 10 is loose on the shaft and a clutch mechanism is employed consisting of a hub 13 connected to the gear wheel 11, shoes 14 bearing on said hub, links 15 pivotally connecting the shoes to the wheel 10 and spring 16 carried by the wheel and bearing on said links. These parts form a frictional clutch connecting the gear wheel 11 to the wheel 10.

It will now be obvious that the hub 13 may be connected to the gear wheel 11 by keying both the gear wheel 11 and hub 13 to the shaft, or they may be formed integral or bolted together and loose on the shaft. It is immaterial which construction is adopted.

A plunger rod 17 is connected to the plunger 2 and slides on a guide block 18 and beneath a pitman 19. The upper face of the pitman 19 is formed into a rack bar. Standards 20 carried by the plunger rod 17 carry pawls 21 which engage the rack teeth of the pitman 19 and lock said pitman and the plunger rod together. Handles 22 depend from these pawls and are engaged by a bar 24 mounted on pivoted arms 25. An operating lever 23 will raise or lower the bar and when lifted it elevates the handles 22 and disengages the pawls from the rack, so that the pitman 19 slides on the plunger rod 17.

The pitman rod 19 is pivoted to a pitman block 27 which slides on a guide 26. A pitman 28 is also connected to said block 27, and this pitman adjacent its outer end is notched and engages a pin 28ª in the bifurcated upper end of a bell crank 29. The other member of this bell crank is angled downwardly as at 30 and to the same is pivotally connected a float 31. The bell crank is pivoted to a beam 32 and the entire device is supported by a pier 33 so that the float 31 will rest in proper position upon the water.

Pins 34 project from the guide block 18 adjacent opposite ends of said block and engage and lift the handles 22, thus disengaging the pawls from the rack should the pitman 19 move too far in either direction. I also provide a stop 35 for the lever 23, and also a locking pin 36 which engages an opening 36ª and which when placed in said opening will lock the lever 23 between said pin and stop 35. A suitable derrick 37 is provided over which runs a cable 38 one end of which is connected to the pitman 28 and by drawing upon the free end portion on said cable the pitman can be lifted out of engagement with the pin 28ª, thus entirely disengaging the device from the float.

It will be obvious that as the float 31 rises and falls, it will rock the bell crank 29, thus operating the pitman 28, pitman rod 19, plunger rod 17 and the other parts as heretofore described.

What I claim is:—

1. In a wave motor, a float, a bell crank connected to said float, a pitman pivotally connected to said bell crank a pitman rod operated by said pitman, a plunger rod, means for converting movement of the plunger rod into a rotary movement in one direction, and means for connecting and disconnecting the pitman rod and the plunger rod.

2. In a wave motor, a plunger rod, a guide block upon which said rod slides, a pitman rod resting loosely upon the plunger rod and having a rack formed upon its upper face, pawls supported by the plunger rod and engaging the rack of the pitman rod, and means for lifting said pawls out of engagement.

3. In a wave motor, a guide frame, a plunger frame sliding in the guide frame, said plunger frame having upper and lower rack bars, a shaft passing through both frames, gear wheels loosely mounted on said shaft and engaging the rack bars respectively, means for alternately locking said gear wheels to the shaft thereby giving the shaft a continuous rotation in one direction, a second shaft operated from the first mentioned shaft, a power wheel loosely mounted on said shaft, a friction clutch for locking said power wheel to said shaft, a float and means for transmitting movement of the float to the plunger frame.

4. In a wave motor a pivoted bell crank, one member of said bell crank having an angled end portion, a float pivoted to said end portion, a pin carried by the other member of the bell crank, a pitman notched to engage said pin, and means operable from said pitman for converting the rise and fall of the float and reciprocation of the pitman into rotary movement in one direction.

5. In a wave motor a pitman rod slidable in horizontal plane, and having a rack bar formed upon it, a plunger rod upon which said pitman rod slides pawls connected to the plunger rod engaging the rack teeth of the pitman rod, and means for automatically throwing said pawls out of engagement upon travel of the pitman rod beyond certain limits in either direction.

ALBERT T. NEWMAN.

Witnesses:
C. H. LYON,
C. L. KAPPELMAN.